(12) United States Patent
Kim et al.

(10) Patent No.: US 11,424,468 B2
(45) Date of Patent: Aug. 23, 2022

(54) ELECTROLYTE MEMBRANE FOR FUEL CELLS AND METHOD OF MANUFACTURING THE SAME

(71) Applicants: HYUNDAI MOTOR COMPANY, Seoul (KR); KIA MOTORS CORPORATION, Seoul (KR)

(72) Inventors: Yong Min Kim, Seoul (KR); Byoung Su Kim, Yongin-si (KR); Seung Jeong Oh, Hwaseong-si (KR); Woong Pyo Hong, Hwaseong-si (KR); Min Kyung Kim, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/065,154

(22) Filed: Oct. 7, 2020

(65) Prior Publication Data
US 2021/0135266 A1  May 6, 2021

(30) Foreign Application Priority Data
Oct. 30, 2019 (KR) .................. 10-2019-0136046

(51) Int. Cl.
| | | |
|---|---|---|
| *H01M 8/1053* | (2016.01) | |
| *H01M 8/1039* | (2016.01) | |
| *H01M 8/106* | (2016.01) | |
| *H01M 8/1062* | (2016.01) | |
| *H01M 8/1086* | (2016.01) | |
| H01M 8/10 | (2016.01) | |

(52) U.S. Cl.
CPC ........ *H01M 8/1053* (2013.01); *H01M 8/106* (2013.01); *H01M 8/1039* (2013.01); *H01M 8/1062* (2013.01); *H01M 8/1086* (2013.01); H01M 2008/1095 (2013.01)

(58) Field of Classification Search
CPC ......... H01M 2008/1095; H01M 4/881; H01M 4/8828; H01M 4/8867; H01M 4/8871; H01M 4/8875; H01M 4/8878; H01M 4/9041; H01M 4/92; H01M 8/1004; H01M 8/1039; H01M 8/1048; H01M 8/1053; H01M 8/106; H01M 8/1062; H01M 8/1086; H01M 8/1093; Y02E 60/50; Y02P 70/50
See application file for complete search history.

(56) References Cited

U.S. PATENT DOCUMENTS

| | | |
|---|---|---|
| 4,959,132 A | 12/1990 | Fedkiw, Jr. |
| 5,342,494 A | 8/1994 | Shane et al. |
| 5,472,799 A | 12/1995 | Watanabe |
| 5,800,938 A | 9/1998 | Watanabe |

FOREIGN PATENT DOCUMENTS

| | | |
|---|---|---|
| KR | 10-1669236 B1 | 10/2016 |
| KR | 10-1877753 B1 | 7/2018 |

*Primary Examiner* — Victoria H Lynch
(74) *Attorney, Agent, or Firm* — McDonnell Boehnen Hulbert & Berghoff LLP

(57) ABSTRACT

The present disclosure relates to an electrolyte membrane for fuel cells having improved chemical durability and a method of manufacturing the same. Specifically, the method includes preparing a polymer film, depositing catalyst metal on one surface or opposite surfaces of the polymer film to obtain a reinforcement layer, and impregnating the reinforcement layer with an ionomer to obtain an electrolyte membrane.

13 Claims, 5 Drawing Sheets

ELECTROLYTE MEMBRANE FOR FUEL CELLS AND METHOD OF MANUFACTURING THE SAME

CROSS REFERENCE TO RELATED APPLICATIONS

This application claims, under 35 U.S.C. § 119(a), the benefit of priority to Korean Patent Application No. 10-2019-0136046 filed on Oct. 30, 2019, the entire contents of which are incorporated herein by reference.

BACKGROUND

(a) Technical Field

The present disclosure relates to an electrolyte membrane for fuel cells having improved chemical durability and a method of manufacturing the same.

(b) Background Art

In a polymer electrolyte membrane fuel cell (PEMFC), an electrolyte membrane serves to conduct hydrogen ions. The electrolyte membrane is manufactured using an ion exchange material in order to transfer hydrogen ions. The ion exchange material contains moisture in order to selectively move hydrogen ions, generated at an anode, to a cathode.

Durability of the electrolyte membrane is reduced by deterioration of the electrolyte membrane due to the crossover of hydrogen. Due to the crossover of hydrogen, the hydrogen contacts oxygen at the interface between the electrolyte membrane and the cathode, whereby hydrogen peroxide is generated. The hydrogen peroxide is dissolved into a hydroxyl radical (.OH) and a hydroperoxylradical (.OOH), whereby the electrolyte membrane is degraded.

In recent years, the thickness of the electrolyte membrane has been reduced in order to reduce cost and to reduce ion resistance of the electrolyte membrane. The thinner the electrolyte membrane, the greater the crossover amount of hydrogen. As a result, the lifespan of the electrolyte membrane gradually decreases.

In order to solve the above problem, technology for adding a small amount of catalyst to an ion exchange layer of the electrolyte membrane in order to prevent generation of radicals has been proposed. However, in the case in which the catalyst is added to the ion exchange layer, as described above, insulation of the electrolyte membrane is easily broken, and the amount of catalyst that is added is increased.

The above information disclosed in this Background section is provided only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with the prior art.

It is an object of the present disclosure to provide an electrolyte membrane for fuel cells capable of preventing transmission of hydrogen and/or oxygen and a method of manufacturing the same.

It is another object of the present disclosure to provide an electrolyte membrane for fuel cells capable of more efficiently removing oxygen than a conventional electrolyte membrane configured such that a catalyst is added to an ion exchange layer and a method of manufacturing the same.

It is a further object of the present disclosure to provide an electrolyte membrane for fuel cells capable of remarkably reducing the loading amount of catalyst metal while exhibiting a function equivalent to or further improved than the function of a conventional electrolyte membrane configured such that a catalyst is added to an ion exchange layer and a method of manufacturing the same.

The objects of the present disclosure are not limited to those described above. The objects of the present disclosure will be clearly understood from the following description and could be implemented by means defined in the claims and a combination thereof.

In one aspect, the present disclosure provides a method of manufacturing an electrolyte membrane for fuel cells, the method including preparing a polymer film, depositing catalyst metal on one surface or opposite surfaces of the polymer film to obtain a reinforcement layer, and impregnating the reinforcement layer with an ionomer to obtain an electrolyte membrane.

The method may further include drying the electrolyte membrane.

The polymer film may include polytetrafluoroethylene (PTFE).

The catalyst metal may include one selected from the group consisting of platinum (Pt), gold (Au), palladium (Pd), rhodium (Rh), iridium (Ir), ruthenium (Ru), and a combination thereof.

The catalyst metal may have a particle form, and the particle diameter of the catalyst metal may be 1 nm to 50 nm.

The catalyst metal may be deposited on the polymer film by sputtering or atomic layer deposition (ALD).

The polymer film may be stretched to obtain the reinforcement layer before and/or after the catalyst metal is deposited.

The reinforcement layer may be a porous membrane including a surface and pores, and the catalyst metal may be deposited only on the surface of the reinforcement layer.

The loading amount of the catalyst metal deposited on the reinforcement layer may be 0.001 mg/cm$^2$ to 0.1 mg/cm$^2$.

The thickness of the reinforcement layer maybe 5 μm to 15 μm, and porosity of the reinforcement layer may be 70% to 90%.

Maximum tensile strength of the reinforcement layer based on ASTM D882 may be 5 MPa to 110 MPa.

The impregnating of the reinforcement layer with an ionomer to obtain an electrolyte membrane may include applying an ionomer to release paper, providing the reinforcement layer on the ionomer to impregnate one surface of the reinforcement layer with the ionomer, and impregnating the other surface of the reinforcement layer with the ionomer.

In another aspect, the present disclosure provides an electrolyte membrane for fuel cells, the electrolyte membrane including a reinforcement layer impregnated with an ionomer, the reinforcement layer having catalyst metal deposited on one surface or opposite surfaces thereof, and an ion exchange layer formed on each of the opposite surfaces of the reinforcement layer.

The catalyst metal may include one selected from the group consisting of platinum (Pt), gold (Au), palladium (Pd), rhodium (Rh), iridium (Ir), ruthenium (Ru), and a combination thereof.

The reinforcement layer may include porous expanded-polytetrafluoroethylene (e-PTFE) stretched uniaxially or biaxially.

The catalyst metal may have a particle form, and the particle diameter of the catalyst metal may be 1 nm to 50 nm.

The reinforcement layer may be a porous membrane including a surface and pores, and the catalyst metal may be deposited only on the surface of the reinforcement layer.

The loading amount of the catalyst metal deposited on the reinforcement layer may be 0.001 mg/cm$^2$ to 0.1 mg/cm$^2$.

The thickness of the reinforcement layer may be 5 μm to 15 μm, and porosity of the reinforcement layer may be 70% to 90%.

Maximum tensile strength of the reinforcement layer based on ASTM D882 may be 5 MPa to 110 MPa.

BRIEF DESCRIPTION OF THE FIGURES

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
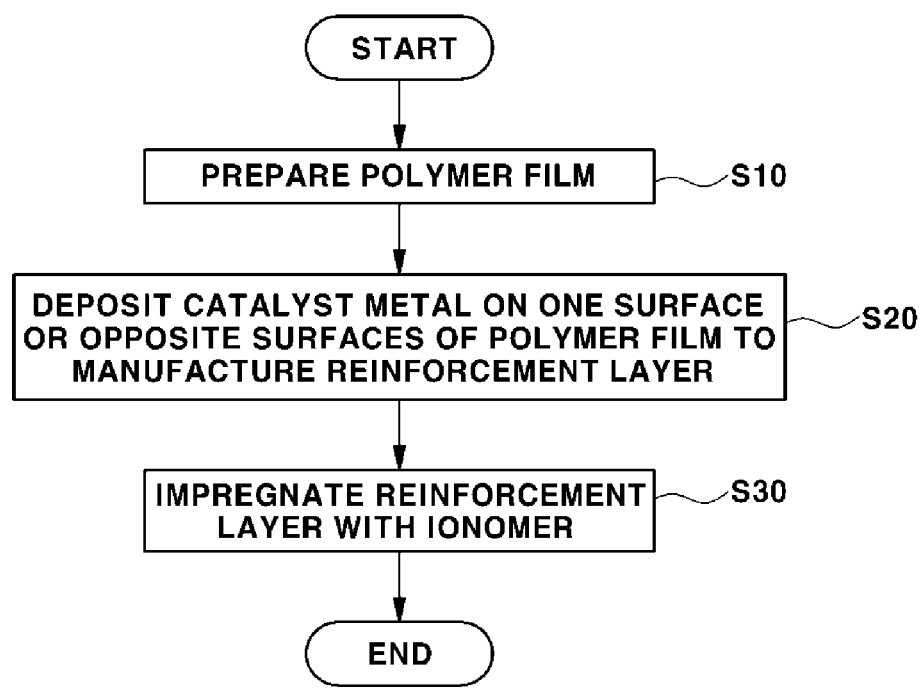
FIG. 1 is a flowchart showing a method of manufacturing an electrolyte membrane for fuel cells according to the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

The objects described above, and other objects, features and advantages will be clearly understood from the following preferred embodiments with reference to the attached drawings. However, the present disclosure is not limited to the embodiments and will be embodied in different forms. The embodiments are suggested only to offer thorough and complete understanding of the disclosed contents and sufficiently inform those skilled in the art of the technical concept of the present disclosure.

Like reference numbers refer to like elements throughout the description of the figures. In the drawings, the sizes of structures are exaggerated for clarity. It will be understood that, although the terms "first", "second", etc. may be used herein to describe various elements, corresponding elements should not be understood to be limited by these terms, which are used only to distinguish one element from another. For example, within the scope defined by the present disclosure, a first element may be referred to as a second element and similarly, a second element may be referred to as a first element. Singular forms are intended to include plural forms as well, unless the context clearly indicates otherwise.

It will be further understood that the terms "comprises", "has" and the like, when used in this specification, specify the presence of stated features, numbers, steps, operations, elements, components or combinations thereof, but do not preclude the presence or addition of one or more other features, numbers, steps, operations, elements, components, or combinations thereof. In addition, it will be understood that, when an element such as a layer, film, region or substrate is referred to as being "on" another element, it can be directly on the other element or an intervening element may also be present. It will also be understood that, when an element such as a layer, film, region or substrate is referred to as being "under" another element, it can be directly under the other element or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures among other things. For this reason, it should be understood that, in all cases, the term "about" should modify all numbers, figures and/or expressions. In addition, when numeric ranges are disclosed in the description, these ranges are continuous and include all numbers from the minimum to the maximum including the maximum within the range unless otherwise defined. Furthermore, when the range refers to an integer, it includes all integers from the minimum to the maximum including the maximum within the range, unless otherwise defined.

FIG. 1 is a flowchart showing a method of manufacturing an electrolyte membrane for fuel cells according to the present disclosure. Referring to this figure, the manufacturing method includes a step of preparing a polymer film at S10, a step of depositing catalyst metal on one surface or opposite surfaces of the polymer film to obtain a reinforcement layer at S20, and a step of impregnating the reinforcement layer with an ionomer to obtain an electrolyte membrane at S30. The manufacturing method may further include a step of drying the electrolyte membrane.

The polymer film may include polytetrafluoroethylene (PTFE).

The shape, size, and thickness of the polymer film are not particularly restricted, and may be appropriately adjusted according to the purpose of use thereof.

Subsequently, catalyst metal is deposited on one surface or opposite surfaces of the polymer film at S20.

The catalyst metal may include one selected from the group consisting of platinum (Pt), gold (Au), palladium (Pd), rhodium (Rh), iridium (Ir), ruthenium (Ru), and a combination thereof. The catalyst metal means catalyst metal itself, rather than catalyst metal doped in a support such as carbon nanotube. In the case in which the catalyst metal is provided on the polymer film after the support is doped with the catalyst metal, the particle size thereof is excessively increased, whereby the catalyst metal may become an obstacle that obstructs movement of ions in the electrolyte membrane. In the present disclosure, therefore, the catalyst metal itself is provided on the polymer film in order to solve the above problem. Specifically, the catalyst metal may have a particle form, and the particle diameter thereof may be 1 nm to 50 nm.

The catalyst metal may be deposited on one surface or opposite surfaces of the polymer film by sputtering or atomic layer deposition (ALD). However, the present disclosure is not limited thereto. Other methods may be used without limitation as long as it is possible to provide the catalyst metal on the polymer film in a particle form.

Figure 2A:
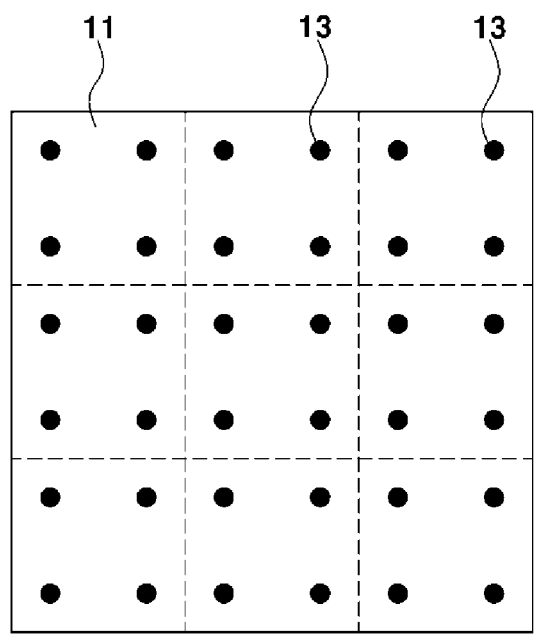
FIG. 2A is a plan view showing a polymer film having catalyst metal deposited thereon.

FIG. 2A is a plan view showing a polymer film 11 having catalyst metal 13 deposited on one surface thereof. FIG. 2A shows the case in which the catalyst metal 13 is deposited on only one surface of the polymer film 11. However, the present disclosure is not limited thereto. The catalyst metal 13 may be deposited on each of opposite surfaces of the polymer film 11 as needed.

Figure 2B:
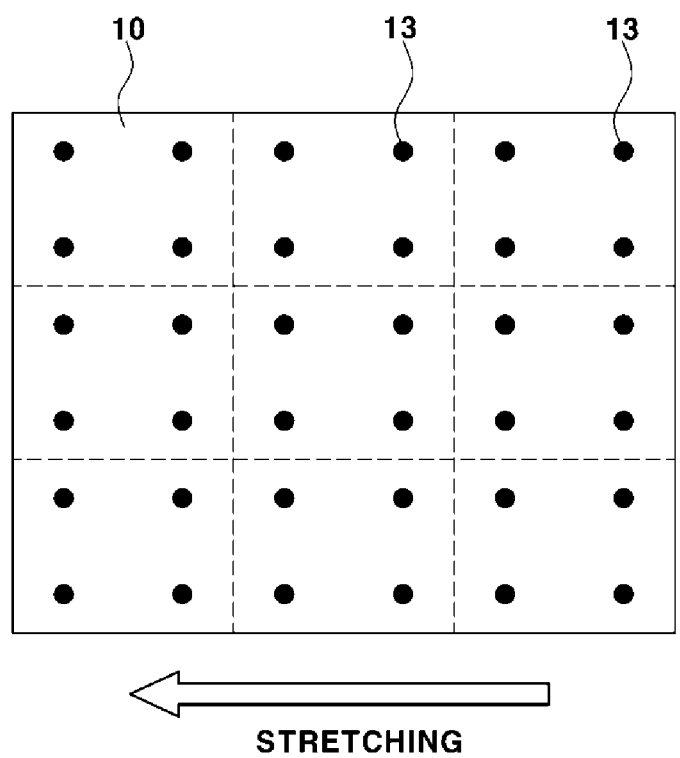
FIG. 2B is a plan view showing a porous reinforcement layer having catalyst metal deposited thereon, obtained by uniaxially stretching the polymer film of FIG. 2A.
Figure 2C:
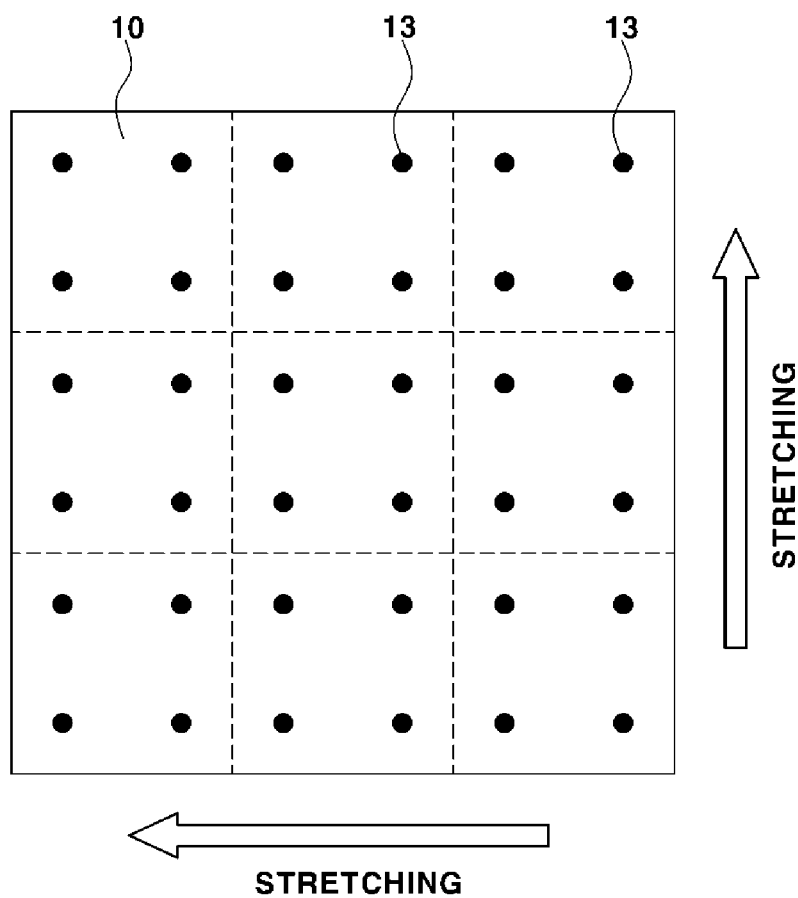
FIG. 2C is a plan view showing a porous reinforcement layer having catalyst metal deposited thereon, obtained by biaxially stretching the polymer film of FIG. 2A.

Before and/or after the catalyst metal is deposited on the polymer film, the polymer film may be stretched. FIG. 2B is a plan view showing a porous reinforcement layer 10 having catalyst metal 13 deposited thereon, obtained by uniaxially stretching the polymer film after the catalyst metal is deposited on the polymer film, and FIG. 2C is a plan view showing a porous reinforcement layer 10 having catalyst metal 13 deposited thereon, obtained by biaxially stretching the polymer film.

It is possible to obtain the porous reinforcement layer 10 by uniaxially or biaxially stretching the polymer film 11, as described above. The reinforcement layer 10 may include expanded-polytetrafluoroethylene (e-PTFE).

Figure 3:
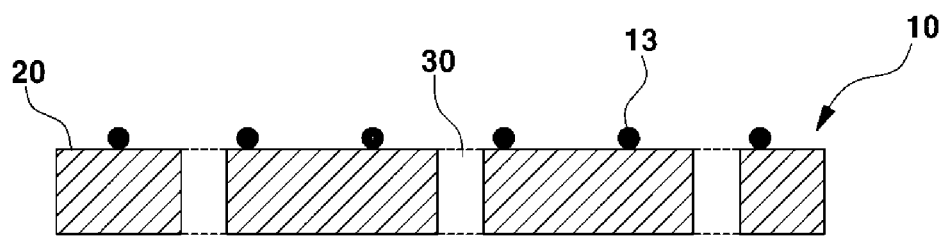
FIG. 3 is a sectional view schematically showing a reinforcement layer according to the present disclosure.

FIG. 3 is a sectional view showing the reinforcement layer 10. Referring to this figure, the reinforcement layer 10 includes a surface 20 and pores 30 formed by stretching. The catalyst metal 13 is deposited only on the surface 20. If the catalyst metal 13 is also provided to the pores 30, the loading amount of catalyst metal may be unnecessarily increased. In addition, since ions move in the electrolyte membrane due to an ionomer with which the pores are impregnated later, conductivity of the ions may be lowered.

The loading amount of catalyst metal 13 that is deposited on the reinforcement layer 10 may be 0.001 mg/cm$^2$ to 0.1 mg/cm$^2$. In this specification, the loading amount of catalyst metal 13 is calculated not based on the polymer film 11, but based on the reinforcement layer 10 obtained by stretching the polymer film 11.

The thickness, porosity, and maximum tensile strength of the reinforcement layer 10 are not particularly restricted, and may be appropriately adjusted according to the purpose of use thereof. For example, the thickness of the reinforcement layer 10 may be 5 μm to 15 μm, the porosity of the reinforcement layer 10 may be 70% to 90%, and the maximum tensile strength of the reinforcement layer 10 based on ASTM D882 may be 5 MPa to 110 MPa.

The reinforcement layer may be impregnated with an ionomer to obtain an electrolyte membrane at S30.

A general ionomer known in the art to which the present disclosure pertains may be used without limitation as the ionomer. In an example, a perfluorosulfonic acid (PFSA) polymer, such as Nafion, may be used.

The method of impregnation with the ionomer is not particularly restricted. A method including a step of applying the ionomer to release paper, a step of providing the reinforcement layer 10 on the applied ionomer to impregnate one surface of the reinforcement layer 10 with the ionomer, and a step of impregnating the other surface of the reinforcement layer 10 with the ionomer may be performed.

Subsequently, the electrolyte membrane, obtained by impregnating the reinforcement layer 10 with the ionomer, may be dried and thermally treated.

The drying and thermal treatment conditions of the electrolyte membrane are not particularly restricted, and the electrolyte membrane may be dried and thermally treated under conditions normally set in the art to which the present disclosure pertains. For example, drying may be performed at 25° C. to 100° C., and thermal treatment may be performed at 140° C. to 200° C.

Figure 4:
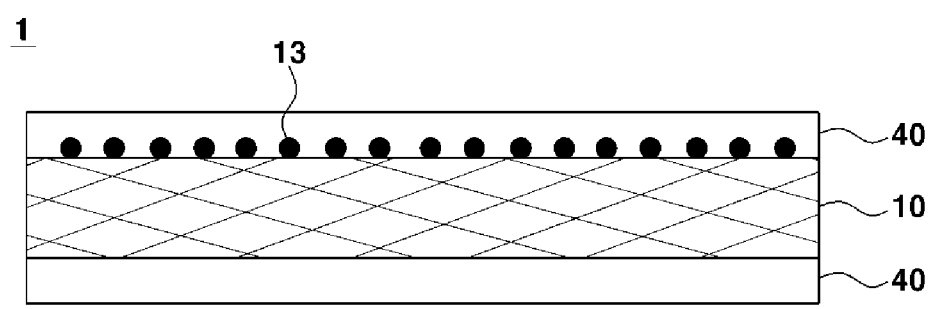
FIG. 4 is a sectional view schematically showing an electrolyte membrane according to the present disclosure.

FIG. 4 is a sectional view schematically showing an electrolyte membrane 1 manufactured using the above method. Referring to this figure, the electrolyte membrane 1 may include a reinforcement layer 10 impregnated with an ionomer, the reinforcement layer 10 having catalyst metal 13 deposited on one surface or opposite surfaces thereof, and an ion exchange layer 40 formed on each of the opposite surfaces of the reinforcement layer 10.

The ion exchange layer 40 is a layer formed by the ionomer, with which the reinforcement layer 10 is impregnated using the above manufacturing method, and the thickness thereof is not particularly restricted.

In the electrolyte membrane 1, the porous reinforcement layer 10 is impregnated with the ionomer between pores thereof. When the fuel cell is operated, oxygen may be transmitted from the cathode to the anode, or hydrogen may move from the anode to the cathode. In this case, the gases must pass through the pores of the reinforcement layer 10. In the present disclosure, the catalyst metal 13 is added to the surface of the reinforcement layer 10, which is the bottleneck of the gases, rather than the ion exchange layer 40, whereby it is possible to effectively prevent movement of the gases.

Also, if the catalyst metal 13 is added to the ion exchange layer 40, an oxygen element of the ionomer included in the ion exchange layer 40 interacts with the catalyst metal 13, whereby activity of the catalyst metal 13 may be lowered. On the other hand, since the reinforcement layer 10 is constituted by a carbon (C)-fluorine (F) combination, the reinforcement layer 10 reacts with the catalyst metal 13. According to the present disclosure, therefore, it is possible to more efficiently remove oxygen than in the case in which the catalyst metal 13 is added to the ion exchange layer 40.

Example

Platinum (Pt), as catalyst metal, was deposited on polytetrafluoroethylene (PTFE), as a polymer film, by sputtering. The polymer film having platinum deposited thereon was biaxially stretched to manufacture a reinforcement layer. At this time, the loading amount of platinum was about 0.01 mg/cm$^2$.

A predetermined amount of PFSA-based ionomer was applied to release paper, and the reinforcement layer was provided on the applied ionomer to impregnate one surface of the reinforcement layer with the ionomer. The same ionomer was applied to the other surface of the reinforcement layer to impregnate the other surface of the reinforcement layer with the ionomer.

An electrolyte membrane obtained using the above method was dried at about 80° C. and was then thermally treated at about 160° C.

Comparative Example

An electrolyte membrane was manufactured using the same materials and method as in Example, except that platinum (Pt), as catalyst metal, was not deposited.

Experimental Example

A pair of electrodes was formed on each of the electrolyte membranes according to Example and Comparative Example to manufacture a membrane-electrode assembly, and open-circuit voltage (OCV) of each membrane-electrode assembly was measured. Results are shown in Table 1 below.

TABLE 1

| Classification | OCV [V] |
|---|---|
| Comparative Example | 0.990 |
| Example | 1.022 |

Referring to this, it can be seen that, in the case in which the electrolyte membrane according to Example is used, OCV of the membrane-electrode assembly is further improved by about 5% or more.

As is apparent from the foregoing, according to the present disclosure, it is possible to effectively remove a gas that is transmitted through an electrolyte membrane, whereby it is possible to increase open-circuit voltage (OCV) of a fuel cell.

According to the present disclosure, it is possible to inhibit generation of radicals in the electrolyte membrane, whereby it is possible to obtain a fuel cell having improved chemical durability and extended lifespan.

According to the present disclosure, it is possible to remarkably reduce the loading amount of catalyst metal that is added to the electrolyte membrane, compared to the conventional art.

The effects of the present disclosure are not limited to those mentioned above. It should be understood that the effects of the present disclosure include all effects that can be inferred from the foregoing description of the present disclosure.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

The invention claimed is:

1. A method of manufacturing an electrolyte membrane for fuel cells, the method comprising:
    preparing a polymer film;
    depositing catalyst metal on one surface or opposite surfaces of the polymer film to produce a reinforcement layer; and
    impregnating the reinforcement layer with an ionomer to obtain an electrolyte membrane.

2. The method according to claim 1, further comprising drying the electrolyte membrane.

3. The method according to claim 1, wherein the polymer film comprises polytetrafluoroethylene (PTFE).

4. The method according to claim 1, wherein the catalyst metal comprises one selected from a group consisting of platinum (Pt), gold (Au), palladium (Pd), rhodium (Rh), iridium (Ir), ruthenium (Ru), and a combination thereof.

5. The method according to claim 1, wherein:
    the catalyst metal has a particle form; and
    a particle diameter of the catalyst metal is 1 nm to 50 nm.

6. The method according to claim 1, wherein the catalyst metal is deposited on the polymer film by sputtering or atomic layer deposition (ALD).

7. The method according to claim 1, wherein the polymer film is stretched to produce the reinforcement layer before and after the catalyst metal is deposited.

8. The method according to claim 1, wherein the polymer film is stretched to produce the reinforcement layer before or after the catalyst metal is deposited.

9. The method according to claim 1, wherein:
    the reinforcement layer is a porous membrane comprising a surface and pores; and
    the catalyst metal is deposited only on the surface of the reinforcement layer.

10. The method according to claim 1, wherein a loading amount of the catalyst metal deposited on the reinforcement layer is 0.001 mg/cm$^2$ to 0.1 mg/cm$^2$.

11. The method according to claim 1, wherein a thickness of the reinforcement layer is 5 μm to 15 μm, and porosity of the reinforcement layer is 70% to 90%.

12. The method according to claim 1, wherein a maximum tensile strength of the reinforcement layer based on ASTM D882 is 5 MPa to 110 MPa.

13. The method according to claim 1, wherein the impregnating the reinforcement layer with an ionomer to obtain an electrolyte membrane comprises:
    applying an ionomer to release paper;
    providing the reinforcement layer on the ionomer to impregnate one surface of the reinforcement layer with the ionomer; and
    impregnating the other surface of the reinforcement layer with the ionomer.

* * * * *